(No Model.)
W. H. WRIGHT.
VEHICLE AXLE.
No. 414,831. Patented Nov. 12, 1889.
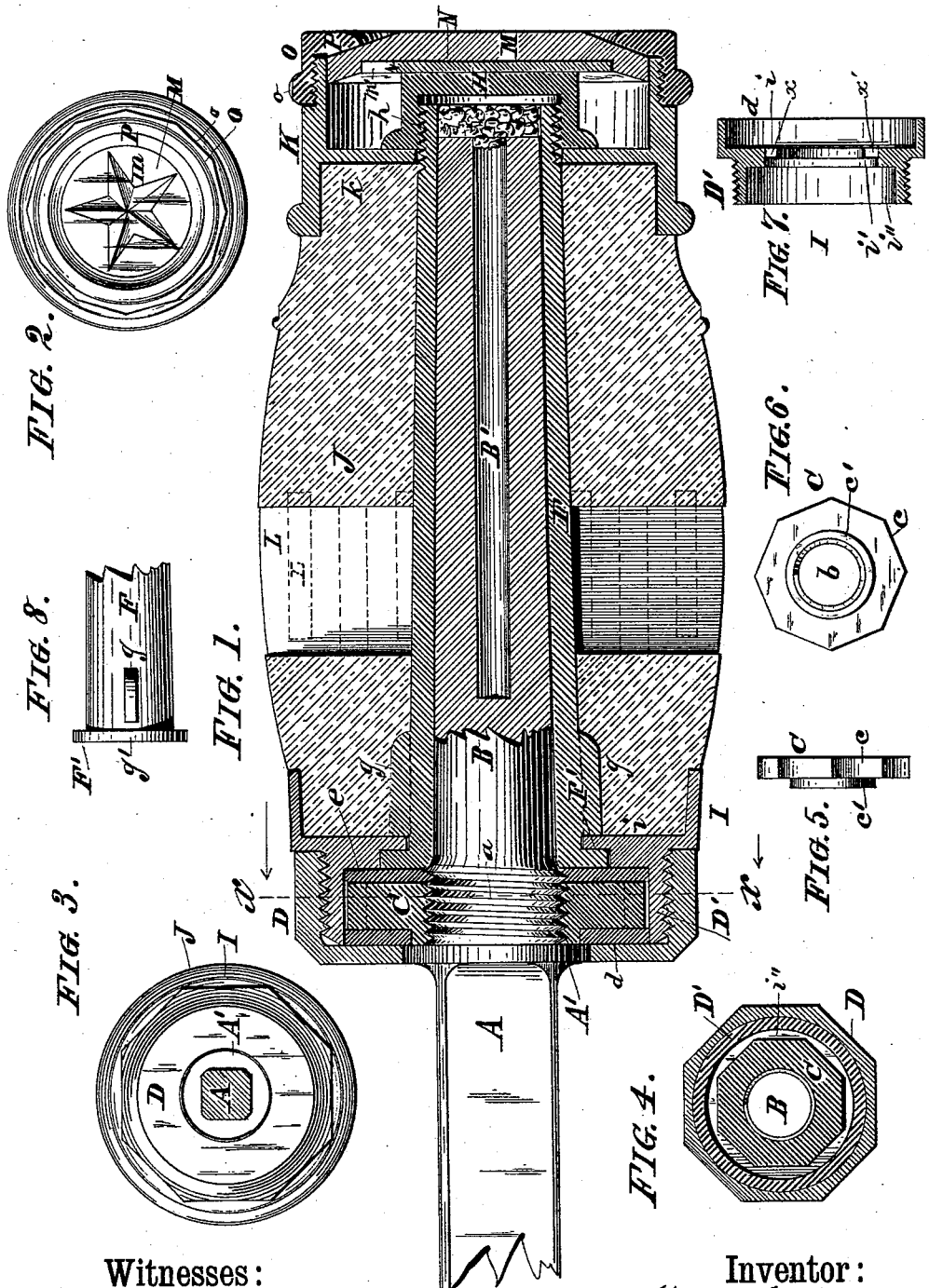

UNITED STATES PATENT OFFICE.

WILLIAM H. WRIGHT, OF BUFFALO, NEW YORK.

VEHICLE-AXLE.

SPECIFICATION forming part of Letters Patent No. 414,831, dated November 12, 1889.

Application filed May 13, 1889. Serial No. 310,598. (No model.)

*To all whom it may concern:*

Be it known that I, WILLIAM H. WRIGHT, of Buffalo, in the county of Erie and State of New York, have invented certain new and useful Improvements in Vehicle-Axles, (Case C;) and I do hereby declare that the following description of my said invention, taken in connection with the accompanying sheet of drawings, forms a full, clear, and exact specification, which will enable others skilled in the art to which it appertains to make and use the same.

This invention has general reference to improvements in vehicle-axles; and it consists, essentially, in the novel and peculiar combination of parts and details of construction, as hereinafter first fully set forth and described, and then pointed out in the claims.

In the drawings already mentioned, which serve to illustrate my said invention more fully, Figure 1 is a longitudinal sectional elevation of my improved vehicle-axle. Fig. 2 is an end view of the same, drawn on a smaller scale. Fig. 3 is a similar view from the inner end of the hub. Fig. 4 is a transverse sectional elevation in line $x\ x$ of Fig. 1. Figs. 5 and 6 are detail views of the axle-collar by which the hub is retained in position. Fig. 7 is a transverse sectional elevation of the inner hub-band detached. Fig. 8 is a plan of a portion of the axle-skein detached.

Like parts are designated by corresponding letters of reference in all the figures.

The object of this invention is the production of a strong, serviceable, and convenient axle and hub fastening for vehicles, and especially the better and finer class of carriages, coaches, landaus, &c., in which a strong and attractive-looking axle, hub, and fastening is a desideratum. To accomplish this object, I construct my improved axle and hub with their fastening substantially as follows:

A is the axle, having the usual collar A' and shank B, the latter having a screw-threaded section $a$ adjoining the said collar. The shank B has centrally and starting from its outer end a bore B', serving as an oil-chamber to contain the necessary lubricating substance, a sponge, cotton waste, or other similar material being placed into the space between the end of the shank B and the cap-nut H, as clearly illustrated in the drawings.

F is the skein. It has on its larger end a flange F', Fig. 8, and behind the same the usual wings or lugs $g\ g$, there being a notch $g'$ in said wings for the passage of the web $i$ of the inner band I, as hereinafter to be referred to.

C is a collar placed upon the screw-threaded portion $a$. It has an annular projection $c'$, Figs. 5 and 6, and an internally-screw-threaded bore $b$. The periphery of the collar C is formed octagonal, so as to adapt it for the reception of a screw-wrench to force the said collar upon the axle, with which it is arranged to make a tight fit.

I is the inner hub-band. It has an annular externally-screw-threaded projection D', Fig. 1, by which it engages a swivel-nut D and two recesses $i'\ i''$, respectively—the former for the reception of the flange F' on the skein F, and the latter for occupation by the collar C, heretofore mentioned. In the flange $i$ of the inner hub-band I there are two notches $x\ x'$, for the passage of the lugs $g$ on the skein F, as shown in Fig. 7. The forward end of the skein is screw-threaded externally to engage the cap-nut H, which secures the outer band K to the hub J by its web $k$, and the inner band I by the flange F', acting upon the web $i$. The outer end of the band K has a rim O, the web P of which bears upon a glass disk M. This disk has in its face ornaments $m$, Fig. 2, produced in any desirable manner, though embossed and silvered ornamentation may generally be usefully employed. In the rear face of this disk M there is a depression $m'$ for the reception of an elastic disk or cushion N, which disk, bearing upon the cap-nut H, prevents the glass disk from being pushed into the hub-band farther than desired, and also acts as a cushion to guard against breakage of the said disk M. Other than glass disks may, however, be employed without changing the nature of my invention.

L in the hub J are mortises to receive tenons of spokes (not shown) in the usual manner.

The outer end of the rim O is beaded, and the bead formed into a series of flat faces $o$, as shown in Figs. 1 and 2, which faces contribute toward the ornamentation of the device, and also enable the said rim being removed and replaced with a wrench when necessary.

The outer surface of the swivel-nut and the bands, &c., are capable of being highly polished, owing to their plain and smooth contour, so that when these parts are plated and polished they form a very neat and attractive device suitable for the finest coaches and carriages.

Having thus fully described my invention, I claim as new and desire to secure by Letters Patent of the United States—

1. As an improved article of manufacture, a vehicle-axle having a collar C, the periphery of which is octagonal in shape, a hub J, having an inner band formed with the externally-screw-threaded rim D' and recesses $i'$ $i''$, a swivel-nut D, engaging said annular rim D', and the skein B', having the flange F and notched lugs $g$, as and for the purpose set forth.

2. In vehicle-axles, the outer hub-band having the screw-threaded rim O, provided with the web P, the glass disk M, provided with the depression $m'$, and the cushion N in said depression, as and for the object stated.

In testimony that I claim the foregoing as my invention I have hereto set my hand in the presence of two subscribing witnesses.

W. H. WRIGHT.

Attest:
MICHAEL J. STARK,
WM. O. STARK.